United States Patent [19]

Taleyarkhan

[11] Patent Number: 4,678,631

[45] Date of Patent: Jul. 7, 1987

[54] BOILING WATER NUCLEAR REACTOR FUEL ASSEMBLY

[75] Inventor: Rusi P. Taleyarkhan, Pittsburgh, Pa.

[73] Assignee: Westinghouse Electric Corp., Pittsburgh, Pa.

[21] Appl. No.: 729,602

[22] Filed: May 2, 1985

[51] Int. Cl.⁴ .............................................. G21C 3/32
[52] U.S. Cl. .................................. 376/444; 376/352; 376/362; 376/443; 376/446
[58] Field of Search ............... 376/444, 443, 439, 446, 376/352, 362

[56] References Cited

U.S. PATENT DOCUMENTS

| | | | |
|---|---|---|---|
| 3,809,610 | 5/1974 | Smith et al. | 176/78 |
| 4,478,786 | 10/1984 | Andersson | 376/444 |
| 4,526,744 | 7/1985 | Borrman | 376/444 |
| 4,560,532 | 12/1985 | Barry | 376/444 |
| 4,578,241 | 3/1986 | Borrman | 376/444 |
| 4,585,616 | 4/1986 | DeMario | 376/444 |
| 4,587,093 | 5/1986 | Borrman | 376/444 |

FOREIGN PATENT DOCUMENTS

| | | |
|---|---|---|
| 2161038 | 6/1973 | France . |
| 0036142 | 9/1981 | PCT Int'l Appl. . |
| 0065238 | 11/1982 | PCT Int'l Appl. . |

Primary Examiner—Donald P. Walsh

[57] ABSTRACT

A BWR fuel assembly having an array of spaced fuel rods, an outer tubular flow channel surrounding the fuel rods so as to direct flow of coolant/moderator fluid along the fuel rods, and a hollow central water cross extending through the outer flow channel and composed of respective pairs of spaced apart sheet members interconnected together at their outer and inner ends so as to define an open inner cruciform flow channel for subcooled moderator fluid flow through the fuel assembly and to the outer channel so as to divide the array of fuel rods into a plurality of fuel rod subassemblies, includes features which improve structural and hydraulic characteristics as well as CHF characteristics. The features which improve structural and hydraulic characteristics relates to closures in the form of perforated plates connected across the bottom and top ends of the sheet members of the water cross. The plates have respective holes sized so as to limit the outlet of the water cross to an open area less than the open area of its inlet so as to distribute hydraulic losses between its inlet and outlet in a way which maintains a positive pressure gradient in the subcooled moderator flow through the water cross inner flow channel relative to the coolant/moderator flow through the fuel rod subassemblies in the outer flow channel. The features which improve CHF characterisitcs relate to a series of holes defined at the same axial height in the sheet members of the water cross nearer to the top outlet ends than the bottom inlet ends of the adjacent fuel rod subassemblies for supplying a portion of the subcooled moderator flow from the inner flow channel in the water cross to the outer flow channel surrounding the fuel rods.

16 Claims, 7 Drawing Figures

BOILING WATER NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Nuclear Fuel Assembly" by Robert F. Barry et al, assigned U.S. Ser. No. 368,555 and filed Apr. 15, 1982 (W.E. 50,013).
2. "Coolant Flow Paths Within A Nuclear Fuel Assembly" by Pratap K. Doshi, assigned U.S. Ser. No. 602,089 and filed Apr. 19, 1984, a continuation of U.S. Ser. No. 368,552, filed Apr. 15, 1982 and now abandoned (W.E. 50,105C).
3. "Water Tubes Arranged In Cross-Like Pattern In A Fuel Assembly" by Carl A. Olson et al, assigned U.S. Ser. No. 642,844 and filed Aug. 20, 1984 (W.E. 51,464).
4. "Cross Brace For Stiffening A Water Cross In A Fuel Assembly" by C. K. Lui, assigned U.S. Ser. No. 672,042 and filed Nov. 16, 1984 (W.E. 52,237).

BACKGROUND OF THE INVENTION

1. Field of the Invention

The present invention relates generally to fuel assemblies for a nuclear reactor and, more particularly, is concerned with a boiling water reactor (BWR) fuel assembly incorporating features which improve its structural integrity, hydraulic effects and critical heat flux (CHF) characteristics.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. Examples of such fuel assemblies are illustrated and described in U.S. Pats. Nos. 3,689,358 to Smith et al and 3,802,995 to Fritz el al and Canadian Pat. No. 1,150,423 to Anderson et al, as well as in the patent applications cross-referenced above.

In a fuel assembly of this type the fuel rods in the central region of the bundle thereof may be under-moderated and overenriched. In order to remedy this condition by increasing the flow of moderator water through this region of the assembly, several arrangements have been proposed. In the Fritz et al patent, one or more elongated empty rods are substituted for fuel rods in the central region of the assembly. In the above cross-referenced Olson et al patent application, water tubes are arranged in a cross-like pattern among the fuel rods in the assembly. In the Anderson et al patent, an elongated centrally-disposed stiffening device with vertical water passageways is used in the assembly. In the above cross-referenced Barry et al, Doshi and Lui patent applications, an elongated centrally-disposed water cross is used in the assembly.

As disclosed in the aforementioned latter three cross-referenced applications, the water cross has a plurality of four radial panels composed by a plurality of four, elongated, generally L-shaped metal angles or sheet members that extend generally along most of the length of the fuel assembly and are spaced apart by a series of interconnecting elements. The interconnecting elements are formed in the sheet members of each panel so as to extend therebetween in aligned, contacting pairs which are connected together such as by welding to ensure that the spacing between the sheet members of each panel is accurately maintained. Thus, the central water cross being in the form of a cruciform water flow channel divides the fuel assembly into four, separate elongated compartments, with the bundle of fuel rods being divided into mini-bundles disposed in the respective compartments, and provides a centrally-disposed cross-shaped path for the flow of subcooled neutron moderator water within the channel along the lengths of, but separated from, adjacent fuel rods in the mini-bundles thereof.

In the central water cross of the above cross-referenced Barry et al and Doshi applications, it was considered advantageous to provide some means to permit coolant flow between the separate minibundles of fuel rods of the fuel assembly to provide hydraulic pressure equalization therebetween. In Barry et al, coolant flow was permitted between fuel rod mini-bundles via openings defined by the pairs of interconnecting elements, whereas in Doshi such elements were changed to the form of closed interconnecting dimples and coolant flow was instead provided via openings in outer longitudinal ribs extending between and interconnecting the outer channel and the radial ends of the water cross panels. In both instances, however, it was felt necessary to prevent the mixing of near boiling coolant flowing within the fuel rod mini-bundles with subcooled moderator flowing through the central water cross.

Notwithstanding the improvements fostered by the cruciform water cross flow channel of the above cross-referenced Barry et al and Doshi applications with respect to hydraulic pressure equalization between the fuel rods mini-bundles, other problems have recently been recognized which, if left uncorrected, detrimentally affect the fuel rod bundle of the assembly and the structural integrity of the water cross. These problems generally related to an inadequate critical heat flux (CHF) margin in some axial regions along the fuel rod bundle and the occurrence of high static pressure loads which can cause water cross dimple weld failure.

With respect to CHF problems of the BWR fuel assembly, it is generally known that CHF occurs when the liquid film cooling a heated surface dries up, or gets washed away leaving a dry path. Under BWR operating conditions, this typically occurs in the annular flow regime. The location of greatest likelihood for a dry heated surface to result lies towards the exit of the heated region of the assembly.

With respect to structural and hydraulic problems of the BWR fuel assembly, conventionally the water cross inlet is designed with flow restrictions such that approximately 9 to 10 percent of the total bundle coolant flow enters the water cross. However, in view that there is little or no flow restriction at the outlet of the water cross, the largest means stresses (static pressure difference between mini-bundle and water cross) occur at its inlet region. Hence, the possibility of fatigue loading induced failure is greatest in the inlet region of the water cross. Indeed, failures of the dimple welds holding the water cross panels together have occurred at the inlet during testing.

By way of example, one water cross design known heretofore has inlet holes of approximately 0.14 inch diameter size while there is no restriction at its outlet. These inlet holes have small cross-sectional areas, and crud buildup during operation can decrease this area. Small area reductions can lead to a substantial increase in orificing (hydraulic loss) which, in turn, leads to even larger pressure losses at the inlet. Hence, lesser flow would tend to enter the water cross leading to the possibility of moderator boiling as well as increased static pressure loading. That is, the fluid static pressure difference between the mini-bundles and the water cross would increase, thus worsening the situation. Heretofore, fluid pressure in the mini-bundles has been greater than that in the water cross at all axial positions. Thus, if at some point fatigue loading or some other mechanism(s) causes dimple weld failure, fluid would enter the water cross from the mini-bundle region. The amount of flow being diverted into the water cross would depend on several factors (e.g. width of opening, pressure differences, etc.); however, this diversion causes depletion of fluid in the mini-bundles, leading to a degradation of fuel rod cooling and a reduction in CHF margin. The consequences of such a situation could mean undesirable operational penalties.

Consequently, the need exists for further improvement of the BWR fuel assembly so as to prolong its useful life by signficantly improving its CHF characteristics and enhancing its structural integrity.

SUMMARY OF THE INVENTION

The present invention provides features which are designed to satisfy the aforementioned needs. These features improve the critical heat flux (CHF) characteristics, structural integrity and hydraulic effects of the BWR fuel assembly.

One discovery underlying the present invention is that some of the subcooled liquid flowing within the channel of the water cross can advantageously be diverted into and mixed with the near boiling coolant in this region of the fuel assembly mini-bundles without adversely affecting the neutron moderation benefits of the water cross subcooled liquid flow. Any addition of liquid in this region would reduce the flow quality, replenish the liquid film and thus improve the CHF characteristics. Therefore, the present invention provides features in the form of holes in the panels of the central water cross to force mixing of the water cross subcooled flow with the mini-bundle flow in the heated region of the assembly where the CHF margin is lowest. This is in the region of each mini-bundle of the assembly approaching its exit end, generally at and above its fifth spacer grid. Calculations indicate that a 10 to 20 percent increase in CHF can be achieved depending on the power profile. This represents a significant benefit in the CPR margin. Increased CPR margins allow plant operators to operate at higher power levels.

The present invention also provides features which reduce high static pressure loads in the water cross and thereby improved the structural integrity and hydraulic effects of the BWR fuel assembly. These features solve the aforementioned structural and hydraulic problems by providing features which distribute the water cross hydraulic losses along its length. The advantage of distributing the hydraulic losses is that it greatly reduces the possibility of fatigue failure, as the fluctuating loads necessary for failure would have to increase substantially. Previously, hydraulic losses substantially occurred only at the water cross inlet, the outlet flow area being much greater than the inlet flow area. Now, in the case of the improvement provided by the present invention, this situation is changed. The water cross inlet flow area is greater than that of the exit, for example, the inlet flow area might be approximately 0.45 sq. in. and the exit flow area approximately 0.35 sq. in., based on hole diameter sizes of approximately 0.21 in. and 0.18 in. respectively. Also, known data shows that with regard to these area sizes, small areas decrements due to crud buildup would tend to have a small impact on the hydraulic loss coefficients.

Another major benefit from these improved features is that after the first few feet along the axial direction from the inlet to the outlet of the water cross, the direction of mean stress reverses. That is, the fluid pressure in the water cross becomes greater than that in the mini-bundles. (Recall that in the previous design with high inlet hydraulic losses, or orificing, that never happens along the entire axial length of the water cross.) Now, if the dimple welds would fail at any location beyond the first few feet of the water cross from the inlet, the liquid in the water cross would be diverted into the mini-bundles. This would improve the fuel rod bundle cooling characteristics, leading to improved CHF margins. The exact axial location where reversal of mean stress occurs will vary with the operating conditions and power profiles. The existence of a positive pressure gradient within the water cross for most of its length, particularly at the location of the coolant diversion holes comprising the features described initially in regard to CHF improvement, ensures also that the direction of flow will be from the water cross through the holes into the mini-bundles. Thus, the positive pressure gradient drives the flow in the desired direction.

In summary, the features of the present invention which focus on improvement of the structural and hydraulic characteristics of the water cross result in substantial benefits in the areas of means stress loading, crud buildup and dimple weld failure induced thermal and hydraulic problems. To optimize the improved effects, hydraulic losses can be incorporated at several axial locations along the water cross. In this manner one can obtain any desired stress profile; however, the fabrication costs and structural complexities would also increase. Under most conditions, the simple approach is preferred, that being, to distribute the previous large water cross inlet loss coefficient between the inlet and outlet as described above. This is relatively straightforward to implement, and gives most of the above-mentioned benefits.

Accordingly, the present invention sets forth improved features in the water cross of a BWR fuel assembly. The fuel assembly includes a plurality of elongated fuel rods disposed in side-by-side relationship so as to form an array of spaced fuel rods, an outer tubular flow channel surrounding the fuel rods so as to direct flow of coolant/moderator fluid along the fuel rods, and a hollow water cross extending through the outer flow channel and having a plurality of hollow panels extending radially from a central axis thereof. The panels are composed of respective pairs of spaced apart sheet members interconnected together at their inner and outer ends so as to define an open inner cruciform flow channel for subcooled moderator fluid flow through the fuel assembly and interconnected with the outer tubular flow channel so as to divide the array of fuel rods into a plurality of fuel rods subassemblies. The respective pairs of sheet members have bottom and top ends which together respectively define an open inlet into and an open outlet from the inner flow channel of the water cross. Each of the respective fuel rod subassemblies has a plurality of grids which each surround the fuel rods and maintain them in their side-by-side spaced relationship. The grids are spaced apart from one another along the length of each subassembly between a bottom inlet end and a top outlet end thereof.

The features incorporated in the water cross which relate to improved structural and hydraulic characteristics comprise means connected with the bottom and top ends of the sheet members of the water cross so as to limit the outlet to an open area less than the open area of the inlet so as to distribute hydraulic losses between the inlet and outlet of the water cross and maintain a positive pressure gradient in the subcooled moderator flow through the water cross inner flow channel relative to the coolant/moderator flow through the fuel rod subassembly in the outer flow channel.

More particularly, the hydraulic losses distributing means include bottom closure means disposed between the sheet members of the water cross at the inlet thereof and having a plurality of holes defined therein which communicate with the inner flow channel of the water cross and are each of a first predetermined diameter size, and top closure means disposed between the sheet members of the water cross at the outlet thereof and having a plurality of holes defined therein which communicate with the inner flow channel of the water cross and are each of a second predetermined diameter size which is greater than the first predetermined diameter size of the holes in the bottom closure means. The respective bottom and top closure means take the form of respective perforated plates connected across the respective bottom and top ends of the water cross sheet members.

The features incorporated in the water cross which relate to improved CHF characteristics comprise means defined in the sheet members of the water cross nearer to the top outlet ends than the bottom inlet ends of the fuel rod subassemblies for supplying a portion of the subcooled moderator flow from the inner flow channel in the water cross to the outer flow channel surrounding the fuel rods.

More particularly, the supplying means is located adjacent one of the grids of each fuel rod subassembly being located nearer to the top outlet end than to the bottom inlet end thereof. Specifically, the supplying means take the form of a series of holes defined in each of the sheet members of the water cross. The holes are aligned at substantially the same axial height along the water cross. Also, the holes in each respective pair of the sheet members forming one of the water cross panels are aligned with one another.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
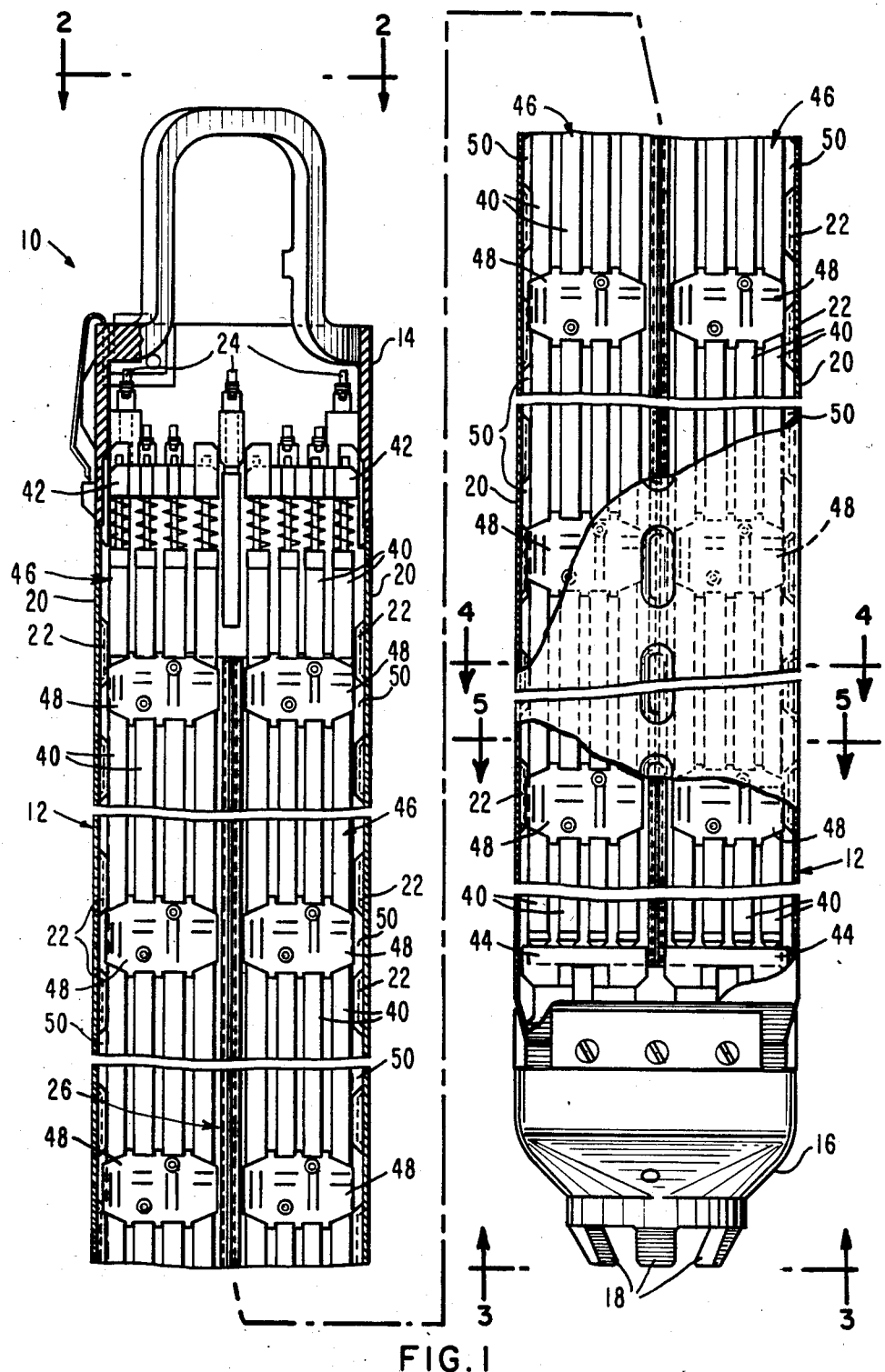
FIG. 1 is an elevational view, with parts broken away and sectioned for clarity, of a BWR nuclear fuel assembly in which the improved features of the present invention are employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed and limiting terms.

In General

Figure 2:
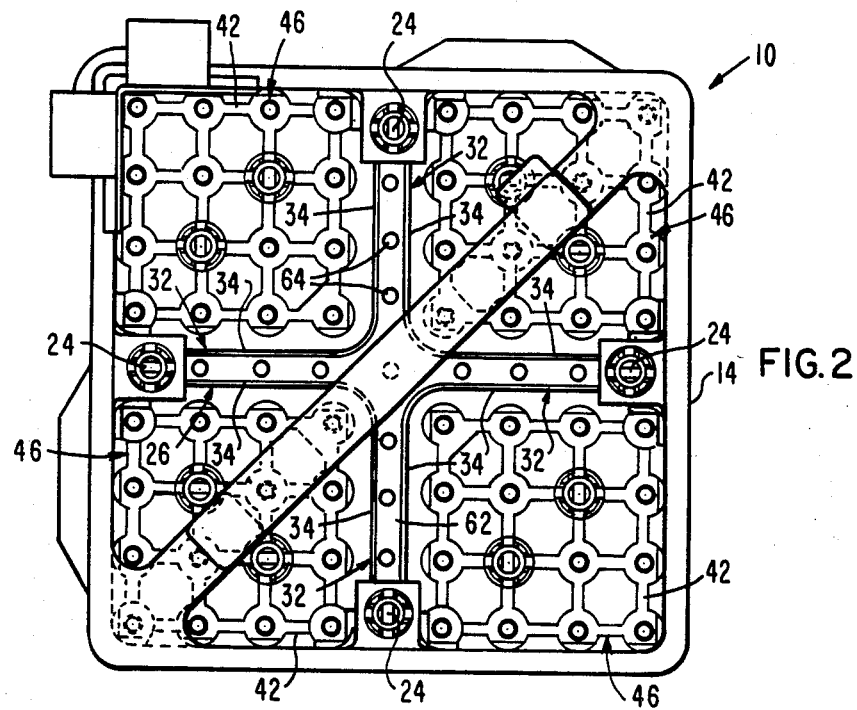
FIG. 2 is an enlarged top plan view of the fuel assembly as seen along line 2—2 of FIG. 1.
Figure 3:
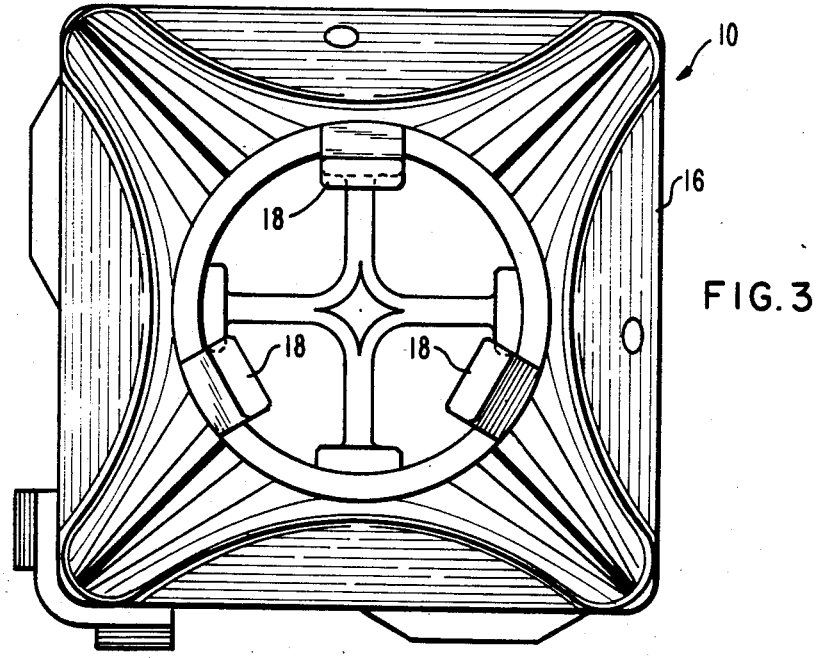
FIG. 3 is an enlarged bottom plan view of the fuel assembly as seen along line 3—3 of FIG. 1.

Referring now to the drawings, and particularly to FIGS. 1 to 3, there is shown a nuclear fuel assembly, generally designated 10, for a boiling water nuclear power reactor (BWR), in which the improvements of the present invention are incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

Figure 4:
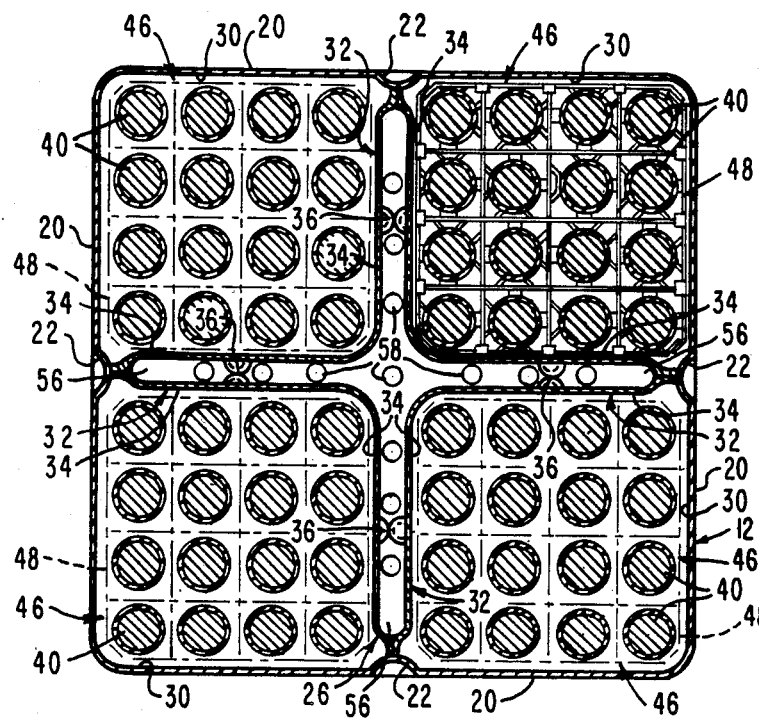
FIG. 4 is a cross-sectional view of the fuel assembly taken along line 4—4 of FIG. 1, showing the fuel rod bundle of the fuel assembly being separated into separate mini-bundles by the water cross with a grid surrounding one of the mini-bundles being shown in full, while the grids surrounding the other three mini-bundles are shown in outline form and also showing the holes at the bottom of the water cross.
Figure 5:
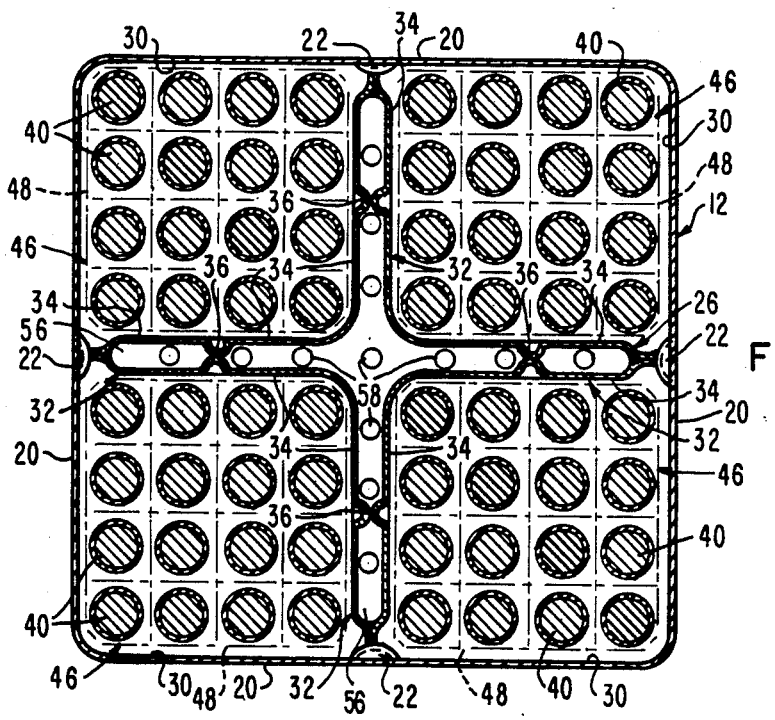
FIG. 5 is another cross-sectional view of the fuel assembly similar to that of FIG. 4, but taken along line 5—5 of FIG. 1 in order to show in cross-section the dimples interconnecting the sheet members of the water cross and in full the spaced ribs on the outer channel to which are attached the outer ends of the water cross.

The outer flow channel 12 (also see FIGS. 4 and 5) generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross, as seen in FIGS. 4 to 7 and generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimpels 36 are formed in and disposed in a vertical column along the axial length of the sheet members 34. Preferably, the dimples 36 in each of the sheet members 34 are laterally and vertically aligned with corresponding dimples 36 in adjacent sheet members 34 (FIGS. 6 and 7) in order to provide pairs of opposed dimples that contact each other along the lengths of the sheet members to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer. elongated lateral ends of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26.

Disposed within the channel 12 is a bundle of fuel rods 40 which, in the illustrated embodiment, number sixty-four and form an 8×8 array. The fuel rod bundle is, in turn, separated into four mini-bundles thereof by the water cross 26. The fuel rods 40 of each mini-bundle, such being sixteen in number in a 4×4 array, extend in laterally spaced apart relationship between an upper tie plate 42 and a lower tie plate 44 and connected together with the tie plates comprises a separate fuel rod subassembly 46 within each of the compartments 30 of the channel 12. A plurality of grids 48 axially spaced along the fuel rods 40 of each fuel rod subassembly 46 maintain the fuel rods in their laterally spaced relationships. Coolant flow paths and flow communication are provided between the fuel rods subassemblies 46 in the respective separate compartments 30 of the fuel assembly 10 by a plurality of openings 50 formed between each of the structural ribs 22 along the lengths thereof. Coolant flow through the openings 50 serves to equalize the hydraulic pressure between the four separate compartments 30, thereby minimizing the possibility of thermal hydrodynamic instability between the separate fuel rod subassemblies 46.

The above-described basic components of the BWR fuel assembly 10 are known in the prior art, being disclosed particularly in the Doshi application cross-referenced above, and have been discussed in sufficient detail herein to enable one skilled in the art to understand the improvements of the present invention presented hereinafter. For a more detailed description of the construction of the BWR fuel assembly, attention is directed to both of the above cross-referenced Barry et al and Doshi patent applications.

Features for Improved Structural and Hydraulic Characteristics

Referring again to FIGS. 4 to 7, the features incorporated in the water cross 26 which provide improved structural and hydraulic characteristics comprise bottom and top closure means, generally indicated as 52 and 54 respectively, connected with the bottom and top ends of the sheet members 34 of the water cross. The top closure means 54 limits the outlet of the water cross 26 to an open area less than the open area of the inlet thereof as limited by the bottom closure means 52. In such manner, the hydraulic losses incurred by the water cross 26 are distributed between the inlet and outlet thereof such that a positive pressure gradient is maintained in the subcooled moderator flow through the water cross inner flow channel 28 relative to the coolant/moderator flow through the fuel rod subassemblies 46 in the outer flow channel 12.

More particularly, the bottom closure means 52 disposed between the sheet members 34 of the water cross 26 at the inlet thereof takes the form of perforated straps or plates 56 having a plurality of holes 58 defined therein by a plurality of short tubes 60 (see FIG. 6) which communicate with the inner flow channel 28 of the water cross 26. Likewise, the top closure means 54 disposed between the sheet members 34 of the water cross 26 at the outlet thereof also takes the form of perforated straps or plates 62 having a plurality of holes 64 defines therein by another plurality of short tubes 66 which communicate with the inner flow channel 28 of the water cross 26. The top holes 64 in the top perforated plates 62 are each of the predetermined diameter size which is greater than the predetermined diameter size of each of the bottom holes 58 in the bottom perforated plates 56. Such relationship between the bottom and top holes 58,64 which distributes the hydraulic losses such that greater loss is experienced at the outlet than at the inlet of the water cross reduces the static pressure loads at the inlet and the risk of failure of dimple welds which interconnect the pairs of sheet members 34 of the water cross 26.

Features for Improved CHF Characteristics

Figure 6:
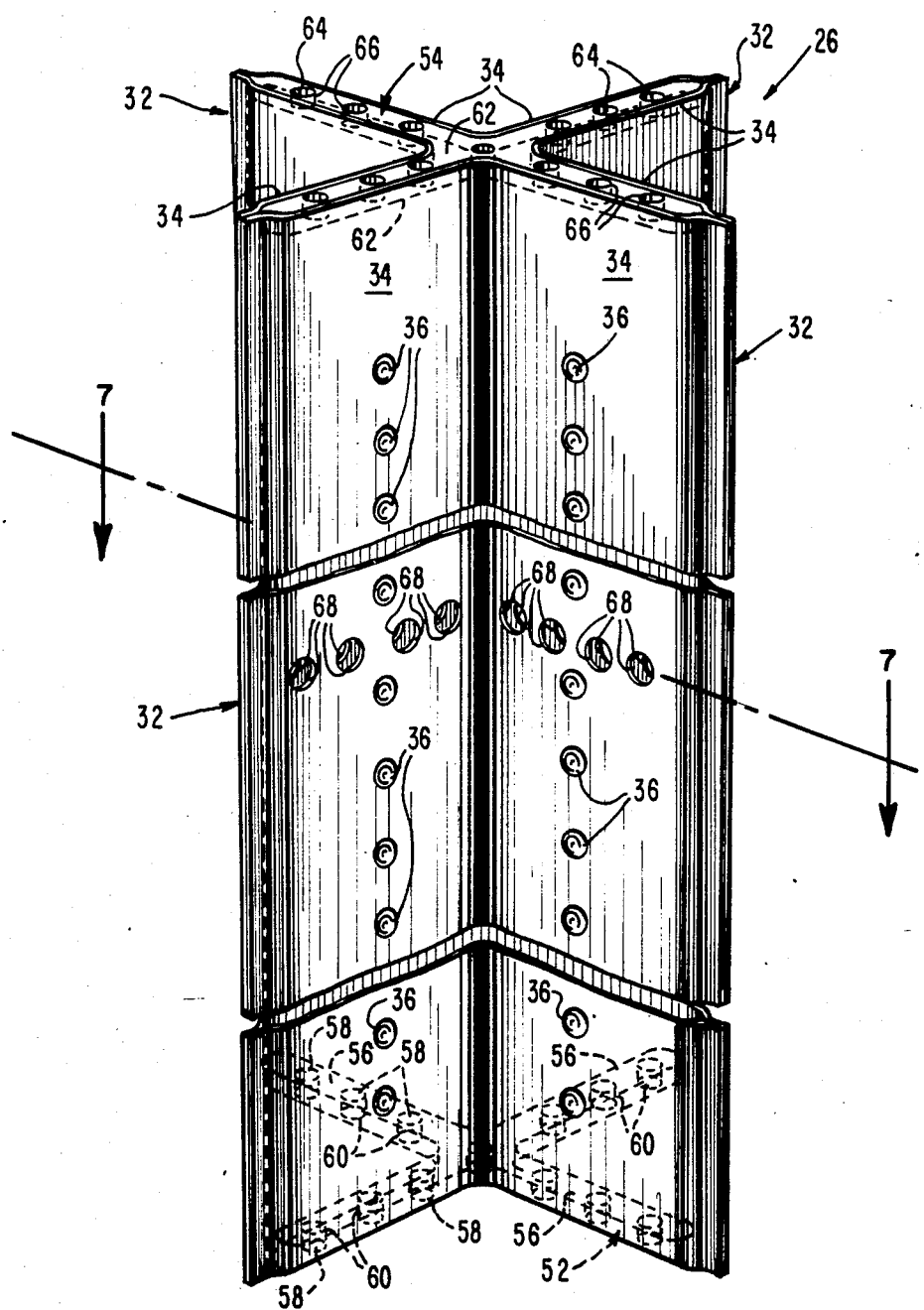
FIG. 6 is an enlarged perspective view, with parts broken away for clarity, of the water cross of the fuel assembly of FIG. 1, showing the inlet and outlet holes defined in the water cross for distributing hydraulic losses therealong and the coolant diversion holes defined in the water cross preferably at the location of approximately the fifth one of the fuel rod mini-bundle grids up from the bottom of the fuel assembly.
Figure 7:
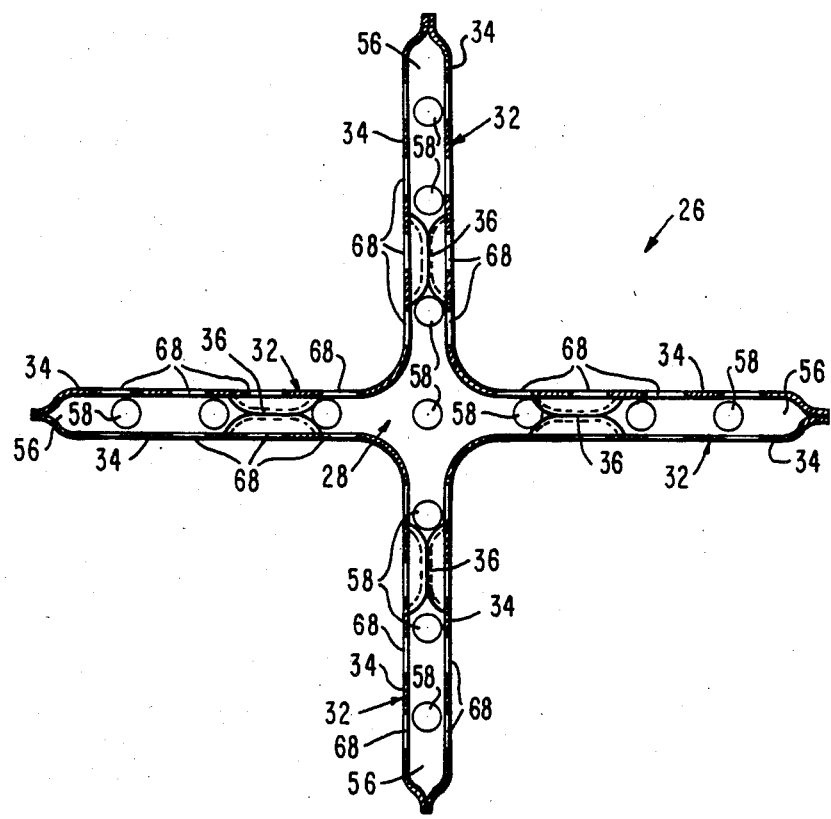
FIG. 7 is an enlarged cross-sectional view of the water cross taken along line 7—7 of FIG. 6, showing the inlet holes and the coolant diversion holes defined in the water cross.

As seen in FIGS. 6 and 7, the features incorporated in the water cross 26 which provide the improved CHF characteristics comprise means in the form of a series of holes 68 defined in the sheet members 34 of the water cross nearer to the top outlet ends at the upper tie plates 42 of the fuel rod subassemblies 46 than to the bottom inlet ends at the lower tie plates 44 thereof. These holes 68 facilitate the supply of a portion of the subcooled moderator flow from the inner flow channel 28 in the water cross 26 to the outer flow channel 12 surrounding the fuel rods 40. It is at the upper regions of the fuel rod subassemblies 46 where dry surfaces are most likely to occur and thus where the CHF characteristics can most desirably be improved by the addition of some subcooled moderator flow from the water cross channel 28.

Specifically, the holes 68 are defined in each of the sheet members 34 of the water cross 26 and are aligned at substantially the same axial height along the water cross, which is at about the fifth one of the spacer grids 48 up from the bottom of each subassembly 46. Also, the holes 68 in each respective pair of the sheet members 34 forming one of the water cross panels 32 are aligned with one another.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a fuel assembly having a plurality of elongated fuel rods disposed in side-by-side relationship so as to form an array of spaced fuel rods, an outer tubular flow channel surrounding said fuel rods so as to direct flow of coolant/moderator fluid along said fuel rods, and a hollow water cross extending through said outer flow channel and having a plurality of hollow panels extending radially from a central axis thereof, said panels being composed of respective pairs of spaced apart sheet members interconnected together at their inner and outer ends so as to define an open inner cruciform flow channel for subcooled moderator fluid flow through said fuel assembly and interconnected with said outer tubular flow channel so as to divide said array of fuel rods into a plurality of fuel rod subassemblies, said respective pairs of sheet members having bottom and top ends which together respectively define an open inlet into and an open outlet from said inner flow channel of said water cross, the improvement which comprises:

partial closure means connected with said bottom and top ends of said sheet members of said water cross so as to limit said top outlet to an open area less than the open area of said bottom inlet so as to distribute hydraulic losses between said inlet and outlet of said water cross.

2. The fuel assembly as recited in claim 1, wherein said partial closure means includes:

bottom closure means disposed between said sheet members of said water cross at said inlet thereof and having a plurality of holes defined therein which communicate with said inner flow channel of said water cross and are each of a first predetermined diameter size; and top closure means disposed between said sheet members of said water cross at said outlet thereof and having a plurality of holes defined therein which communicate with said inner flow channel of said water cross and are each of a second predetermined diameter size which is greater than said first predetermined diameter size of said holes in said bottom closure means.

3. The fuel assembly as recited in claim 2, wherein said relative diameter sizes of said respective holes in said bottom and top closure means are such that a positive pressure gradient is maintained in the subcooled moderator flow through said water cross inner flow channel relative to the coolant/moderator flow through said fuel rod subassembly in said outer flow channel.

4. The fuel assembly as recited in claim 2, wherein said respective bottom and top closure means take the form of respective perforated plates connected across said respective bottom and top ends of said water cross sheet members.

5. In a fuel assembly having a plurality of elongated fuel rods disposed in side-by-side relationship so as to form an array of spaced fuel rods, an outer tubular flow channel surrounding said fuel rods so as to direct flow of coolant/moderator fluid along said fuel rods, and a hollow water cross extending through said outer flow channel and having a plurality of hollow panels extending radially from a central axis thereof, said panels being composed of respective pairs of spaced apart sheet members interconnected together at their inner and outer ends so as to define an open inner cruciform flow channel for subcooled moderator fluid flow through said fuel assembly and interconnected with said outer tubular flow channel so as to divide said array of fuel rods into a plurality of fuel rod subassemblies, each of said respective fuel rod subassemblies having a plurality of grids which each surround said fuel rods and maintain them in said side-by-side spaced relationship, said grids being spaced apart from one another along the length of said each subassembly between a bottom inlet end and a top outlet end thereof, the improvement which comprises:

flow communicating means defined in said sheet members of said water cross nearer to said top outlet ends than said bottom inlet ends of said fuel rod subassemblies for supplying a portion of said subcooled moderator flow from said inner flow channel in said water cross to said outer flow channel surrounding said fuel rods.

6. The fuel assembly as recited in claim 5, wherein said flow communicating means is located adjacent one of said grids of each fuel rod subassembly being located nearer to said top outlet end than to said bottom inlet end thereof.

7. The fuel assembly as recited in claim 5, wherein said flow communicating means take the form of a series of holes defined in each of said sheet members of said water cross.

8. The fuel assembly as recited in claim 7, wherein said holes are aligned at substantially the same axial height along said water cross.

9. The fuel assembly as recited in claim 8, wherein said holes in each respective pair of said sheet members forming one of said water cross panels are aligned with one another.

10. In a fuel assembly having a plurality of elongated fuel rods disposed in side-by-side relationship so as to form an array of spaced fuel rods, an outer tubular flow channel surrounding said fuel rods so as to direct flow of coolant/moderator fluid along said fuel rods, and a hollow water cross extending through said outer flow channel and having a plurality of hollow panels extending radially from a central axis thereof, said panels being composed of respective pairs of spaced apart sheet members interconnected together at their inner and outer ends so as to define an open inner cruciform flow channel for subcooled moderator fluid flow through said fuel assembly and interconnected with said outer tubular flow channel so as to divide said array of fuel rods into a plurality of fuel rod subassemblies, said respective pairs of sheet members having bottom and top ends which together respectively define an open inlet into and open outlet from said inner flow channel of said water cross, each of said respective fuel rod subassemblies having a plurality of grids which each surround said fuel rods and maintain them in said side-by-side spaced relationship, said grids being spaced apart from one another along the length of said each subassembly between a bottom inlet end and a top outlet end thereof, the improvement which comprises:

(a) closure means connected with said bottom and top ends of said sheet members of said water cross so as to limit said outlet to an open area less than the open area of said inlet so as to distribute hydraulic losses between said inlet and outlet of said water cross and maintain a positive pressure gradient in the subcooled moderator flow through said water cross inner flow channel relative to the coolant/moderator flow through said fuel rod subassembly in said outer flow channel; and (b) flow communicating means defined in said sheet members of said water cross nearer to said top outlet ends than said bottom inlet ends of said fuel rod subassemblies for supplying a portion of said subcooled moderator flow from said inner flow channel in said water cross to said outer flow channel surrounding said fuel rods.

11. The fuel assembly as recited in claim 10, wherein said closure means includes:

bottom closure means disposed between said sheet members of said water cross at said inlet thereof and having a plurality of holes defined therein which communicate with said inner flow channel of said water cross and are each of a first predetermined diameter size; and top closure means disposed between said sheet members of said water cross at said outlet thereof and having a plurality of holes defined therein which communicate with said inner flow channel of said water cross and are each of a second predetermined diameter size which is greater than said first predetermined diameter size of said holes in said bottom closure means.

12. The fuel assembly as recited in claim 11, wherein said respective bottom and top closure means take the form of respective perforated plates connected across said respective bottom and top ends of said water cross sheet members.

13. The fuel assembly as recited in claim 10, wherein said flow communicating means is located adjacent one of said grids of each fuel rod subassembly being located nearer to said top outlet end than to said bottom inlet end thereof.

14. The fuel assembly as recited in claim 10, wherein said flow communicating means take the form of a series of holes defined in each of said sheet members of said water cross.

15. The fuel assembly as recited in claim 14, wherein said holes are aligned at substantially the same axial height along said water cross.

16. The fuel assembly as recited in claim 15, wherein said holes in each respective pair of said sheet members forming one of said water cross panels are aligned with one another.

* * * * *